(12) United States Patent
Tagami et al.

(10) Patent No.: US 9,522,674 B2
(45) Date of Patent: Dec. 20, 2016

(54) INTERNAL COMBUSTION ENGINE CONTROL DEVICE AND INTERNAL COMBUSTION ENGINE CONTROL METHOD

(71) Applicant: HONDA MOTOR CO., LTD., Tokyo (JP)

(72) Inventors: Hiroshi Tagami, Wako (JP); Shinsuke Shimoda, Wako (JP); Takashi Kashimura, Wako (JP); Hiroaki Shinoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/780,221

(22) PCT Filed: Feb. 20, 2014

(86) PCT No.: PCT/JP2014/054056
§ 371 (c)(1),
(2) Date: Sep. 25, 2015

(87) PCT Pub. No.: WO2014/156392
PCT Pub. Date: Oct. 2, 2014

(65) Prior Publication Data
US 2016/0046283 A1    Feb. 18, 2016

(30) Foreign Application Priority Data

Mar. 26, 2013    (JP) .................................. 2013-064964

(51) Int. Cl.
*B60W 20/00*    (2016.01)
*B60K 5/12*    (2006.01)
(Continued)

(52) U.S. Cl.
CPC ................ *B60W 20/40* (2013.01); *B60K 5/12* (2013.01); *B60K 6/46* (2013.01); *B60W 10/06* (2013.01);
(Continued)

(58) Field of Classification Search
CPC combination set(s) only.
See application file for complete search history.

(56) References Cited

U.S. PATENT DOCUMENTS

2014/0014065 A1*    1/2014    Hayashi .................. F02D 29/02
123/339.1

FOREIGN PATENT DOCUMENTS

JP    10-248103 A    9/1998
JP    2000-295707 A    10/2000
(Continued)

OTHER PUBLICATIONS

International Search Report dated Apr. 15, 2014, issued in counterpart application No. PCT/JP2014/054056 (2 pages).

*Primary Examiner* — Thomas Tarcza
*Assistant Examiner* — Edward J Pipala
(74) *Attorney, Agent, or Firm* — Westerman, Hattori, Daniels & Adrian, LLP

(57) ABSTRACT

A hybrid vehicle includes a battery, a generation unit having an internal combustion engine and a generator configured to supply electric power generated to a motor or the battery, the motor, and a mount which connects the internal combustion engine to a vehicle body. An internal combustion engine control device for the vehicle includes a generation unit activation determination portion which determines whether or not the generation unit needs to be activated to operate, a mount displacement quantity deriving portion which derives a mount displacement quantity indicating an extended/contracted length of the mount, and an internal
(Continued)

combustion engine control portion which prohibits a start of the internal combustion engine a case the mount displacement quantity exceeds a threshold.

11 Claims, 12 Drawing Sheets

(51) Int. Cl.
*B60K 6/46* (2007.10)
*B60W 10/06* (2006.01)
*F02D 29/02* (2006.01)
*F02N 11/08* (2006.01)
*B60W 10/08* (2006.01)
*B60W 30/192* (2012.01)
*F02D 41/04* (2006.01)
*B60W 30/20* (2006.01)

(52) U.S. Cl.
CPC .............. *B60W 10/08* (2013.01); *B60W 20/15* (2016.01); *B60W 30/192* (2013.01); *B60W 30/20* (2013.01); *F02D 29/02* (2013.01); *F02D 41/042* (2013.01); *F02N 11/0818* (2013.01); *B60W 2030/206* (2013.01); *Y02T 10/48* (2013.01); *Y02T 10/6217* (2013.01); *Y10S 903/905* (2013.01); *Y10S 903/906* (2013.01)

(56) References Cited

FOREIGN PATENT DOCUMENTS

| JP | 3463739 B2 | 11/2003 |
|---|---|---|
| JP | 2004-159404 A | 6/2004 |
| JP | 2009-035121 A | 2/2009 |
| JP | 2009-257130 A | 11/2009 |
| JP | 2011-185148 A | 9/2011 |

* cited by examiner

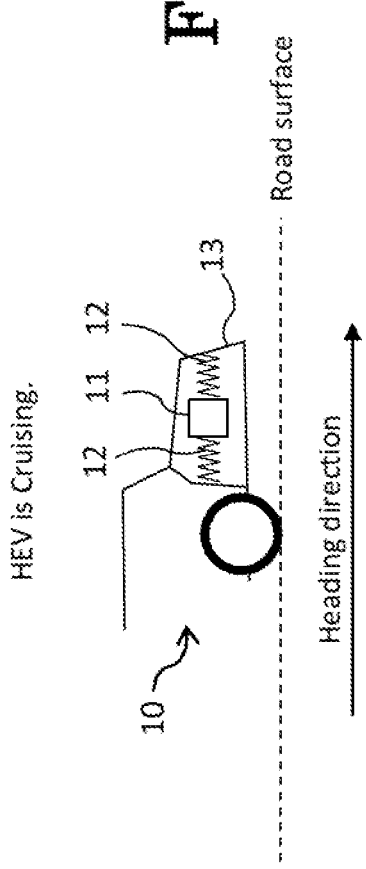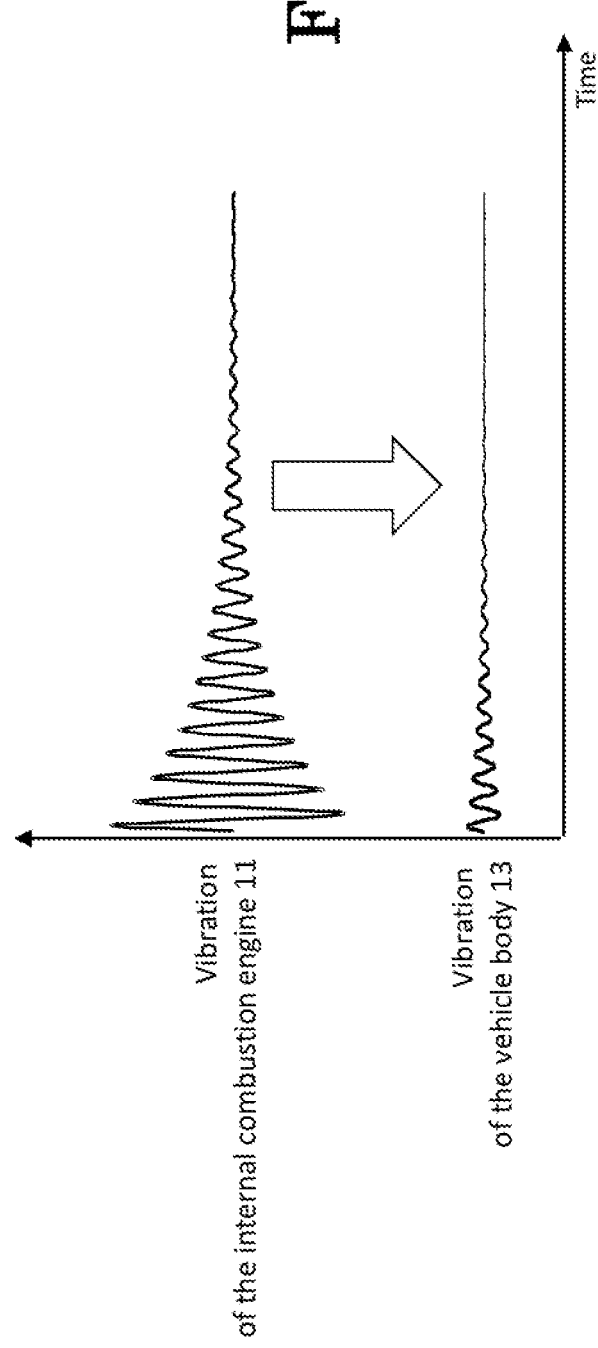

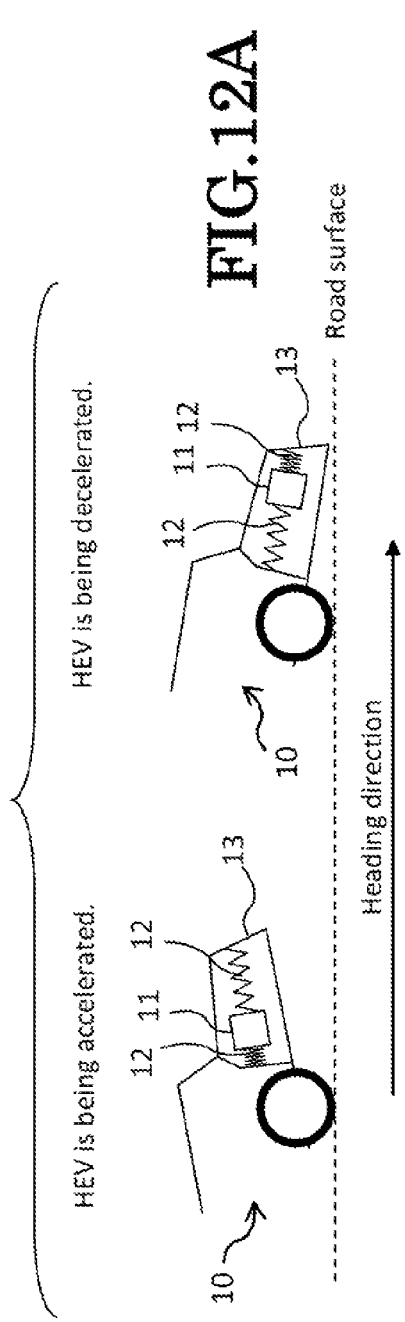
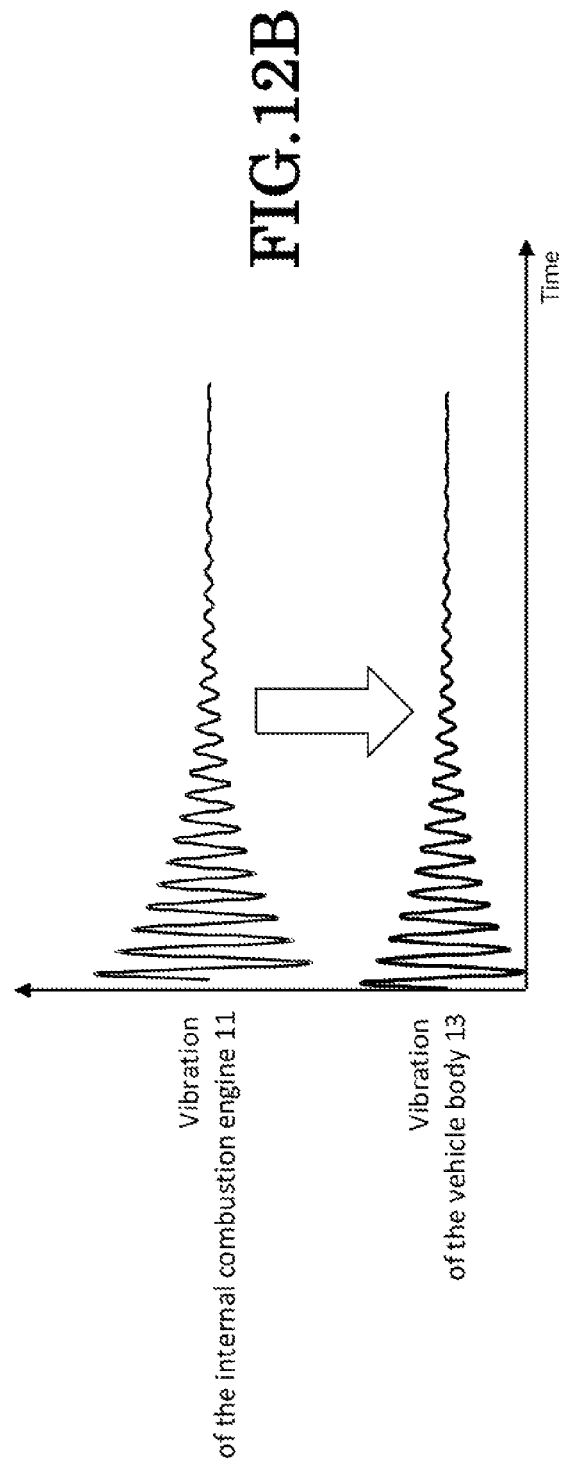

INTERNAL COMBUSTION ENGINE CONTROL DEVICE AND INTERNAL COMBUSTION ENGINE CONTROL METHOD

TECHNICAL FIELD

The present invention relates to an internal combustion engine control device and an internal combustion engine control method for a hybrid vehicle.

BACKGROUND ART

Patent literatures 1 to 3 disclose a technology for suppressing the generation of vibration when an internal combustion engine mounted on a vehicle is started. Patent literature 1 discloses an engine start control device for suppressing the extension of a period of time during which self-excited vibration of a vibration isolating device is generated due to a difference in previous stop position of pistons of an engine. In addition, patent literature 2 discloses a start control device for an internal combustion engine of a parallel type hybrid vehicle which makes an acceleration performance compatible with a vibration damping performance when the engine is started. This hybrid vehicle has an engine stop mode, and the start control device changes an engine revolution speed at which fuel injection is started according to a target torque of the engine when the engine is started. Further, patent literature 3 discloses an engine control method for increasing an engine output with good response while reducing the generation of vibration which is associated with a start of an engine.

RELATED ART LITERATURE

Patent Literature

Patent Literature 1: JP-A-2011-185148
Patent Literature 2: JP-A-2009-35121
Patent Literature 3: JP-B-3463739

SUMMARY OF THE INVENTION

Problem that the Invention is to Solve

The respective technologies disclosed in patent literatures 1 to 3 which are described above are effective approaches in the event that the vehicle is at a halt when the internal combustion engine is started. However, although those technologies are applied to an HEV (Hybrid Electric Vehicle) which includes a motor and an internal combustion engine as a drive source, in the event that the HEV is being accelerated or decelerated, the vibration damping performance when the internal combustion engine is started is reduced.

FIG. 11A is a diagram showing a state of an internal combustion engine mounted on an HEV when the HEV is cruising, and FIG. 11B shows a graph showing the vibration of the internal combustion engine and the vibration of a vehicle body when the internal combustion engine is started while the HEV is cruising. As shown in FIG. 11A, the internal combustion engine 11 mounted on the HEV 10 is connected to the vehicle body 13 via an engine mount 12 having a vibration isolating function. In FIG. 11A, springs by which the internal combustion engine 11 is connected to the vehicle body 13 exhibit the vibration isolating function of the engine mount 12. A large magnitude of force acting in a heading direction is not exerted on the internal combustion engine 11 when the HEV 10 is cruising. Consequently, even though the internal combustion engine 11 is started when the HEV 10 is cruising, as shown in FIG. 11B, vibration generated in the internal combustion engine 11 is absorbed by the engine mount 12, generating a small magnitude of vibration in the vehicle body 13.

However, when the HEV 10 is being accelerated or decelerated, a large magnitude of force acting in the heading direction or an opposite direction thereto is exerted on the internal combustion engine 11. FIG. 12A is a diagram showing a state of the internal combustion engine mounted on the HEV when the HEV is being accelerated or decelerated, and FIG. 12B shows a graph showing the vibration of the internal combustion engine and the vibration of the vehicle body when the internal combustion engine is started while the HEV is being accelerated or decelerated. As shown in FIG. 12A, when the HEV 10 is being accelerated, a force acting in an opposite direction to the heading direction of the HEV 10 is exerted on the internal combustion engine 11, and the internal combustion engine 11 is pressed against the vehicle body 13 via the engine mount 12. On the contrary, when the HEV 10 is being decelerated, a force acting in the heading direction of the HEV 10 is exerted on the internal combustion engine 11, and the internal combustion engine is pressed against the vehicle body 13 via the engine mount 12.

In the engine mount 12 which is contracted by the force exerted on the internal combustion engine 11, the vibration isolating function is reduced. Consequently, in the event that the internal combustion engine 11 is started while the HEV 10 is being accelerated or decelerated, as shown in FIG. 12B, vibration generated in the internal combustion engine 11 is not absorbed by the engine mount 12 but is transmitted to the vehicle body 13. As a result, the driver of the HEV 10 feels the vibration of the vehicle body 13, and hence, no improvement in NV (Noise Vibration) performance which is an evaluation standard based on which the comfortableness for the driver who drives the vehicle is evaluated is not realized.

An object of the invention is to provide an internal combustion engine control device and an internal combustion engine control method for suppressing the reduction in NV performance when an internal combustion engine of a hybrid vehicle is started or stopped.

Means for Solving the Problem

With a view to achieving the object by solving the problem described above, according to an invention described in claim 1, there is provided an internal combustion engine control device for a hybrid vehicle having:

a rechargeable battery (for example, a battery 101 in an embodiment) which supplies electric power to a motor which is a drive source of the hybrid vehicle;

a generation unit (for example, an APU 121 in the embodiment) which has an internal combustion engine (for example, an internal combustion engine 109 in the embodiment) and a generator (for example, a generator 111 in the embodiment) generating electric power by means of an operation of the internal combustion engine, and which supplies the electric power generated by the generator to the motor or the battery;

the motor (for example, a motor 107 in the embodiment) which is driven by means of electric power supplied from at least one of the battery and the generation unit; and a mount (for example, an engine mount 125 in the embodiment) which has a vibration isolating function, and which connects the internal combustion engine to a vehicle body (for example, a vehicle body 127 in the embodiment) of the hybrid vehicle, wherein the internal combustion engine control device includes:

a generation unit activation determination portion (for example, an APU activation determination portion 151 in the embodiment) which determines whether or not the generation unit needs to be activated to operate;

a mount displacement quantity deriving portion (for example, a mount displacement quantity deriving portion 153 in the embodiment) which derives a mount displacement quantity indicating an extended/contracted length of the mount; and an internal combustion engine control portion (for example, an internal combustion engine operation control portion 155) which prohibits a start of the internal combustion engine in a case the mount displacement quantity calculated by the mount displacement quantity deriving portion exceeds a threshold when the generation unit activation determination portion determines that the generation unit needs to be activated to operate.

Further, according to an invention described in claim 9, there is provided an internal combustion engine control device for a hybrid vehicle having:

a rechargeable battery (for example, a battery 101 in an embodiment) which supplies electric power to a motor which is a drive source of the hybrid vehicle;

a generation unit (for example, an APU 121 in the embodiment) which has an internal combustion engine (for example, an internal combustion engine 109 in the embodiment) and a generator (for example, a generator 111 in the embodiment) generating electric power by means of operation of the internal combustion engine, and which supplies the electric power generated by the generator to the motor or the battery;

the motor (for example, a motor 107 in the embodiment) which is driven by means of electric power supplied from at least one of the battery and the generation unit; and a mount (for example, an engine mount 125 in the embodiment) which has a vibration isolating function, and which connects the internal combustion engine to a vehicle body (for example, a vehicle body 127 in the embodiment) of the hybrid vehicle, wherein the internal combustion engine control device includes:

a generation unit activation determination portion (for example, an APU activation determination portion 151 in the embodiment) which determines whether or not the generation unit needs to be activated to operate;

a mount displacement quantity deriving portion (for example, a mount displacement quantity deriving portion 153 in the embodiment) which derives a mount displacement quantity indicating an extended/contracted length of the mount; and an internal combustion engine control portion (for example, an internal combustion engine operation control portion 155) which prohibits a stop of the internal combustion engine in a case the mount displacement quantity derived by the mount displacement quantity deriving portion exceeds a threshold when the generation unit activation determination portion determines that the generation unit does not need to be activated to operate.

Further, the internal combustion engine control device according to an invention described in claims 3 and 11 is characterized in that the internal combustion engine control portion permits the start or stop of the internal combustion engine in a case the mount displacement quantity is smaller than or equal to the threshold when the generation unit activation determination portion determines that the generation unit needs or does not need to be activated to operate.

Further, the internal combustion engine control device according to an invention described in claim 4 is characterized in that the internal combustion engine control portion permits the start or stop of the internal combustion engine in a case a predetermined period of time elapses with the mount displacement quantity kept smaller than or equal to the threshold when the generation unit activation determination portion determines that the generation unit needs or does not need to be activated to operate.

Further, the internal combustion engine control device according to an invention described in claim 5 is characterized in that the internal combustion engine control portion permits the start or stop of the internal combustion engine in a case a required output according to an operation by a driver of the hybrid vehicle is equal to or greater than a predetermined value when a predetermined period of time elapses with the mount displacement quantity kept smaller than or equal to the threshold, in such a case that the generation unit activation determination portion determines that the generation unit needs or does not need to be activated to operate.

Further, the internal combustion engine control device according to an invention described in claim 6 is characterized in that the predetermined value is higher as a driving speed of the hybrid vehicle is faster.

Further, the internal combustion engine control device according to an invention described in claim 7 is characterized in that the predetermined value is higher as a gradient of a road on which the hybrid vehicle drives is greater.

Further, the internal combustion engine control device according to an invention described in claim 8 is characterized in that the internal combustion engine control portion permits the start of the internal combustion engine irrespective of the mount displacement quantity in a case the generation unit activation determination portion determines that the generation unit needs to be activated to operate when an energy consumption state is high in the hybrid vehicle.

Further, according to an invention described in claim 9, there is provided an internal combustion engine control method for a hybrid vehicle having:

a rechargeable battery (for example, a battery 101 in an embodiment) which supplies electric power to a motor which is a drive source of the hybrid vehicle;

a generation unit (for example, an APU 121 in the embodiment) which has an internal combustion engine (for example, an internal combustion engine 109 in the embodiment) and a generator (for example, a generator 111 in the embodiment) generating electric power by means of an operation of the internal combustion engine, and which supplies the electric power generated by the generator to the motor or the battery;

the motor (for example, a motor 107 in the embodiment) which is driven by means of electric power supplied from at least one of the battery and the generation unit; and a mount (for example, an engine mount 125 in the embodiment) which has a vibration isolating function, and which connects the internal combustion engine to a vehicle body (for example, a vehicle body 127 in the embodiment) of the hybrid vehicle, wherein the internal combustion engine control method includes the steps of:

determining whether or not the generation unit needs to be activated to operate;

deriving a mount displacement quantity which indicates an extended/contracted length of the mount; and prohibiting a start of the internal combustion engine in a case the mount displacement quantity exceeds a threshold when it is determined that the generation unit needs to be activated to operate.

Further, according to an invention described in claim 10, there is provided an internal combustion engine control method for a hybrid vehicle having:

a rechargeable battery (for example, a battery 101 in an embodiment) which supplies electric power to a motor which is a drive source of the hybrid vehicle;

a generation unit (for example, an APU 121 in the embodiment) which has an internal combustion engine (for example, an internal combustion engine 109 in the embodiment) and a generator (for example, a generator 111 in the embodiment) generating electric power by means of an operation of the internal combustion engine, and which supplies the electric power generated by the generator to the motor or the battery;

the motor (for example, a motor 107 in the embodiment) which is driven by means of electric power supplied from at least one of the battery and the generation unit; and a mount (for example, an engine mount 125 in the embodiment) which has a vibration isolating function, and which connects the internal combustion engine to a vehicle body (for example, a vehicle body 127 in the embodiment) of the hybrid vehicle, wherein the internal combustion engine control method includes the steps of:

determining whether or not the generation unit needs to be activated to operate;

deriving a mount displacement quantity which indicates an extended/contracted length of the mount; and prohibiting a stop of the internal combustion engine in a case the mount displacement quantity exceeds a threshold when it is determined that the generation unit does not need to be activated to operate.

Advantage of the Invention

According to the internal combustion engine control device described in claims 1 and 3 to 8, and the internal combustion engine control method described in claim 9, it is possible to suppress the reduction in NV performance when the internal combustion engine is started in the hybrid vehicle.

According to the internal combustion engine control device described in claims 2 and 11, and the internal combustion engine control method described in claim 10, it is possible to suppress the reduction in NV performance when the internal combustion engine is stopped in the hybrid vehicle.

According to the internal combustion engine control device described in claim 4, it is possible to start or stop the internal combustion engine in such a state that the mount displacement quantity is stabilized to stay at the threshold.

According to the internal combustion engine control device described in claim 5, it is possible to suppress the reduction in NV performance because the internal combustion engine is started or stopped when the driving energy of the hybrid vehicle is large and the NV level is large.

BRIEF DESCRIPTION OF THE DRAWINGS

FIG. 11A is a diagram showing a state of an internal combustion engine mounted on an HEV when the HEV is cruising, and FIG. 11B shows a graph showing the vibration of the internal combustion engine and the vibration of a vehicle body when the internal combustion engine is started while the HEV is cruising.

FIG. 12A is a diagram showing a state of the internal combustion engine mounted on the HEV when the HEV is being accelerated or decelerated, and FIG. 12B shows a graph showing the vibration of the internal combustion engine and the vibration of the vehicle body when the internal combustion engine is started while the HEV is being accelerated or decelerated.

MODE FOR CARRYING OUT THE INVENTION

Hereinafter, embodiments of the invention will be described by reference to the drawings.

An HEV (Hybrid Electrical Vehicle) includes a motor and an internal combustion engine and is driven by means of a driving force of the motor and/or the internal combustion engine according to the driving conditions of the vehicle. HEVs are divided roughly into two system types; a series system and a parallel system. A series system HEV is driven by means of the power of the motor. The internal combustion engine is used only to generate electric power. The electric power generated in a generator by means of the power of the internal combustion engine is used to charge a battery or is supplied to the motor.

The series system HEV is "EV driven" or "series driven." In the EV drive mode, the HEV is driven by means of a driving force of the motor which is driven by means of electric power which is supplied from a battery. As this occurs, the internal combustion engine is not driven. In the series drive mode, the HEV is driven by means of a driving force of the motor which is driven by means of electric power supplied from both the battery and a generator or electric power supplied from only the generator. As this occurs, the internal combustion engine is driven only to drive the generator which generates electric power.

A parallel system HEV is driven by means of a driving force of either or both of the motor and the internal combustion engine. A series/parallel system HEV is also known in which both the series and parallel systems are combined. In the series/parallel system, a clutch is released or applied (disengaged or engaged) according to the driving conditions of the vehicle, whereby a transmission system of driving force is switched to either the series system or the parallel system.

First Embodiment

Figure 1:
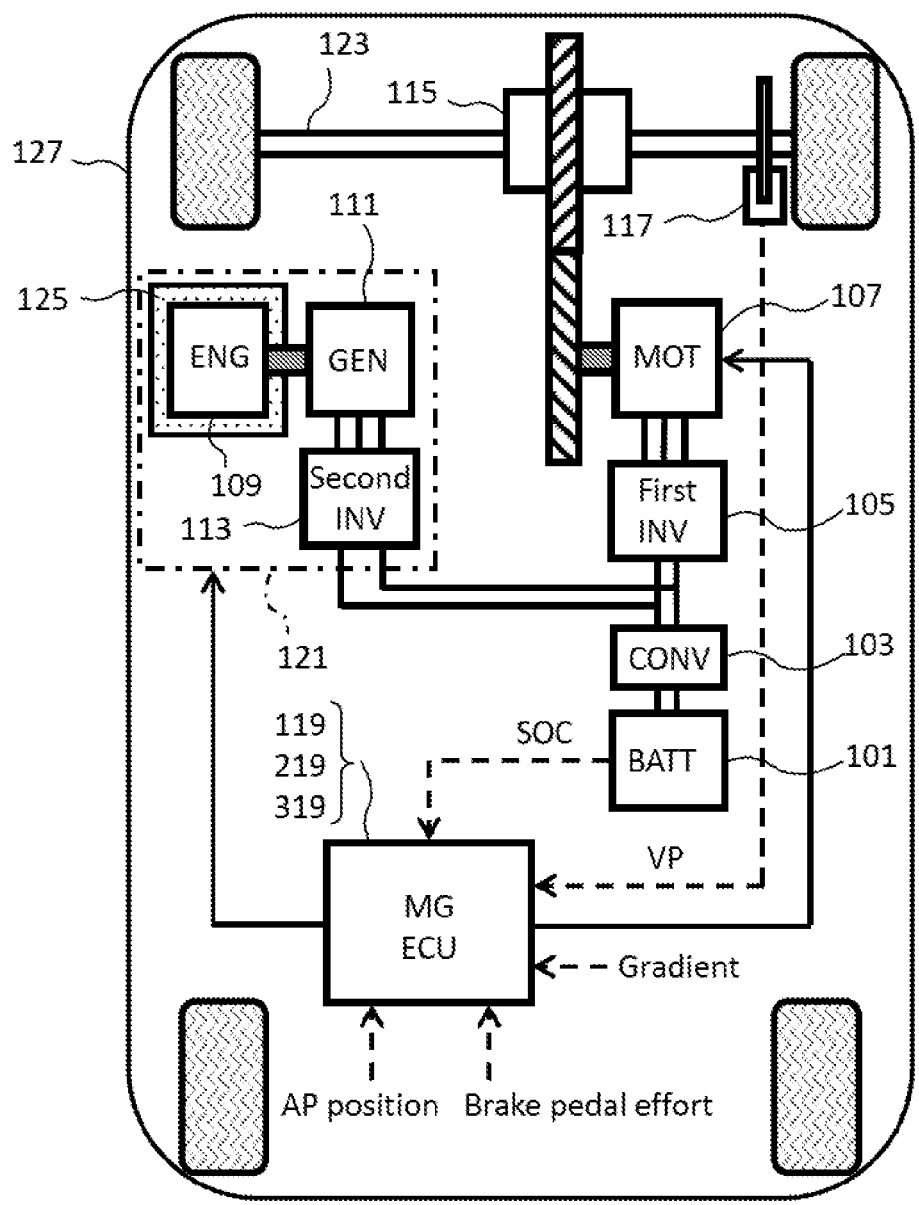
FIG. 1 is a block diagram showing an internal configuration of a series system HEV.

FIG. 1 is a block diagram showing an internal configuration of a series system HEV. As shown in FIG. 1, a series system HEV (hereinafter, referred to simply as a "vehicle") includes a battery (BATT) 101, a converter (CONV) 103, a first inverter (first INV) 105, a motor (Mot) 107, an internal combustion engine (ENG) 109, a generator (GEN) 111, a second inverter (second INV) 113, a gearbox (hereinafter, referred to simply as a "gear") 115, a vehicle speed sensor 117, and a management ECU (MG ECU) 119. In FIG. 1, arrows shown by a dotted line indicate flows of value data, and arrows shown by a solid line indicate flows of control signal that signal instructions. In the following description, the internal combustion engine 109, the generator 111 and the second inverter 113 will collectively be referred to as "auxiliary power unit (APU) 121.

The battery 101 has a plurality of battery cells which are connected in series and supplies a high voltage in the range of 100 to 200V, for example. The battery cells are, for example, lithium ion battery cells or nickel-metal hydride battery cells. The converter 103 increases or decreases a direct current output voltage of the battery 101 as the voltage outputted remains as direct current. The first inverter 105 converts direct current voltage into alternating current voltage and supplies a three-phase current to the motor 107. The first inverter 105 also converts alternating current voltage which is inputted when the motor 107 is performing a regenerative operation into direct current voltage for supply to the battery 101.

The motor 107 generates power by means of which the vehicle is driven. Torque generated in the motor 107 is transmitted to a drive shaft 123 by way of the gear 115. A rotor of the motor 107 is connected directly to the gear 115. In addition, the motor 107 operates as a generator when regenerative braking is performed therein, and electric power generated in the motor 107 is used to charge the battery 101. The internal combustion engine 109 is used to drive the generator 111 when the vehicle is series driven. The internal combustion engine 109 is connected directly to a rotor of the generator 111. In addition, the internal combustion engine 109 is connected to a vehicle body 127 via an engine mount 125 having a vibration isolating function.

The vibration isolating function of the engine mount 125 is realized by the elasticity (low rigidity) of a frame which makes up the engine mount 125 and/or a damper such as a rubber or a spring which is attached to the frame. According to the vibration isolating function of the engine mount 125, vibration generated in the internal combustion engine 109 is absorbed in the engine mount 125 and hence does not reach the vehicle body 127.

In this embodiment, an extended or contracted length of the engine mount 125 will be referred to as a "mount displacement quantity" which results from the engine mount 125 which is a member which can be extended and contracted being deformed as a result of the internal combustion engine 109 being pressed against the vehicle body 127 via the engine mount 125 when the vehicle is accelerated or decelerated. The mount displacement quantity is an axial length along a heading direction of the vehicle based on a state in which the vehicle is at a halt on a flat ground.

The generator 111 is driven by means of power of the internal combustion engine 109 to generate electric power. The electric power generated by the generator 111 is used to charge the battery 101 or is supplied to the motor 107. The second inverter 113 converts an alternating current voltage generated by the generator 111 into a direct current voltage. The electric power converted by the second inverter 113 is used to charge the battery 101 or is supplied to the motor 107 via the first inverter 105.

The gear 115 is a one-speed fixed gear which corresponds, for example, to a fifth gear. Consequently, the gear 115 converts a driving force from the motor 107 into a revolution speed and torque at a specific gear ratio and transmits them to the drive shaft 123. A vehicle speed sensor 117 detects a driving speed (a vehicle speed VP) of the vehicle. A signal that signals the vehicle speed VP detected by the vehicle speed sensor 117 is sent to the management ECU 119.

The management ECU 119 acquires information indicating a vehicle speed VP detected by the vehicle speed sensor 117, an accelerator pedal position (AP position) corresponding to an accelerator pedal depression by the driver of the vehicle, brake pedal effort corresponding to a brake pedal depression by the driver of the vehicle, a gradient of a road on which the vehicle drives, and a residual capacity (SOC: State of Charge) that indicates a state of the battery 101. In addition, the management ECU 119 calculates a required output based on the vehicle speed VP and the AP position and controls the motor 107 and the APU 121 individually. Further, the management ECU 119 determines whether or not the APU 121 needs to be activated to operate according to the SOC of the battery 101 and the required output.

Additionally, the management ECU 119 derives a mount displacement quantity. As this occurs, the management ECU 119 calculates a target output value of the motor 107 for the required output which the management ECU 119 has calculated based on the vehicle speed VP and the AP position and sets the target output value as a mount displacement quantity. The management ECU 119 may acquire an actual output value of the motor 107 to set the actual output value as a mount displacement quantity. The management ECU 119 may set the required output which is calculated based on the vehicle speed VP and the AP position as a mount displacement quantity. The management ECU 119 may set a variation of the AP position or a variation of the brake pedal effort as a mount displacement quantity.

Further, the management ECU 119 may correct the mount displacement quantity according to a gradient of a road on which the vehicle drives. For example, when the vehicle is being accelerated on an uphill, the management ECU 119 corrects the mount displacement quantity according to the gradient of the uphill so that the mount displacement quantity becomes greater than a mount displacement resulting when the vehicle is being accelerated on a flat road. In addition, when the vehicle is being decelerated on a downhill, the management ECU 119 corrects the mount displacement quantity according to the gradient of the downhill so that the mount displacement quantity becomes greater than the mount displacement resulting when the vehicle is being accelerated on the flat road.

Figure 2:
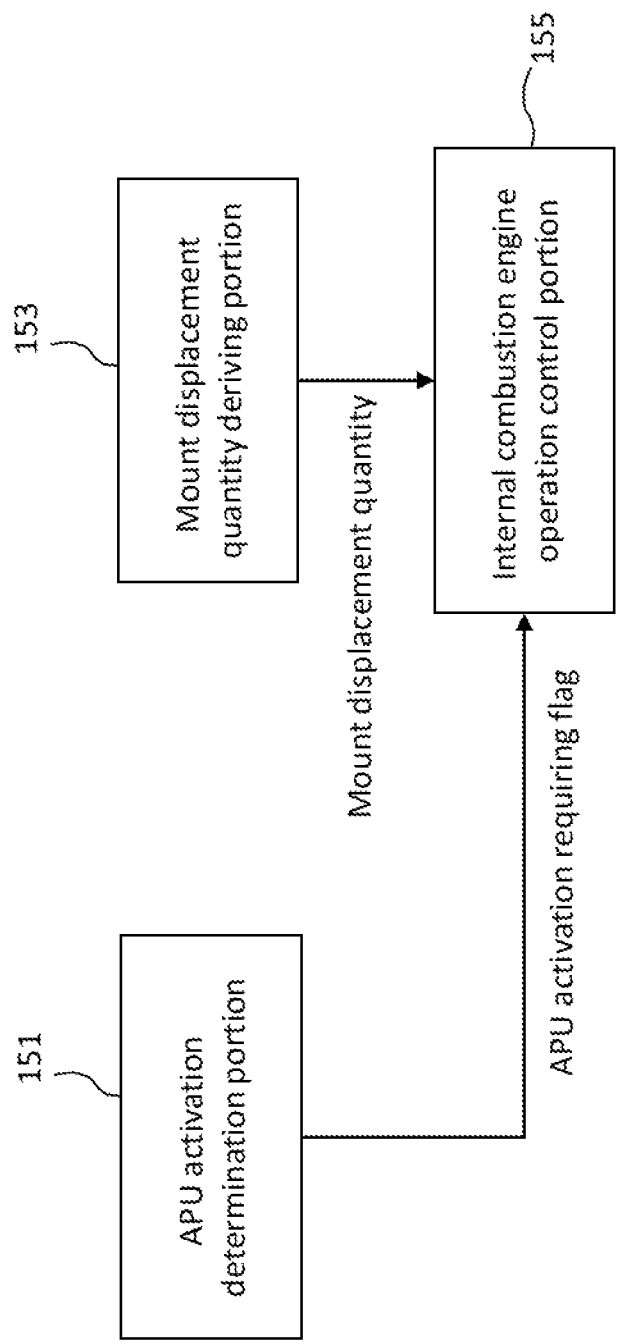
FIG. 2 is a block diagram showing an internal configuration of a management ECU 119.

FIG. 2 is a block diagram showing an internal configuration of the management ECU 119. As shown in FIG. 2, the management ECU 119 has an APU activation determination portion 151, a mount displacement quantity deriving portion 153 and an internal combustion engine operation control portion 155. The APU activation determination portion 151 determines whether or not the APU 121 needs to be activated to operate according to the SOC of the battery 101 and the required output. The mount displacement quantity deriving portion 153 derives a mount displacement quantity. When the APU activation determination portion 151 determines that the APU 121 needs or does not need to be activated to operate, the internal combustion engine operation control portion 155 controls a start or stop of the internal combustion engine which the APU 121 includes according to the mount displacement quantity which is derived by the mount displacement quantity deriving portion 153.

First Example

Start of Internal Combustion Engine 109

Figure 3:
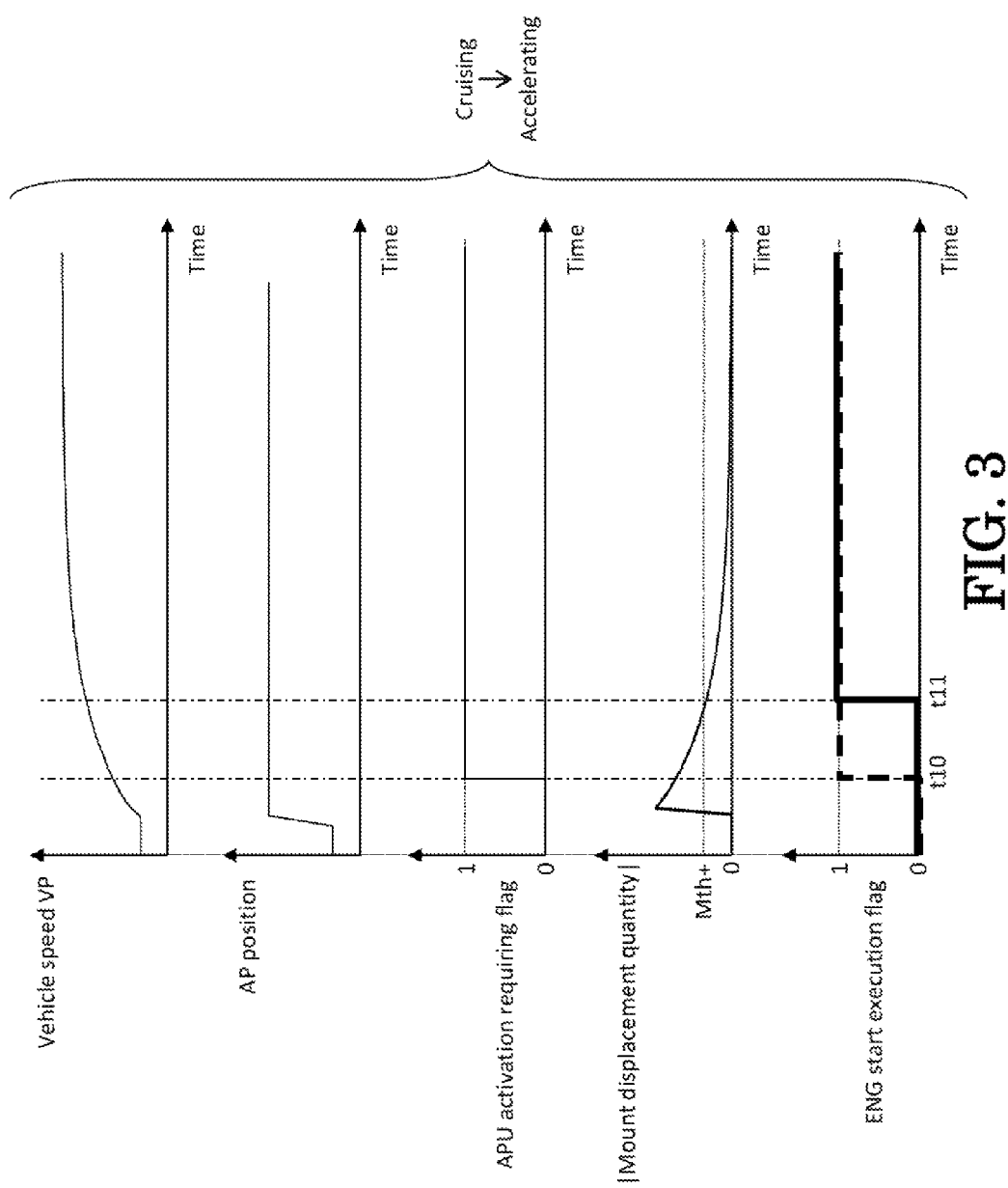
FIG. 3 is a graph showing an example of a change in each of vehicle speed VP, AP position, APU activation requiring flag, absolute value of mount displacement quantity and ENG start execution flag when the vehicle of a first embodiment is accelerated from a cruising.

FIG. 3 is a graph showing an example of a change in each of vehicle speed VP, AP position, APU activation requiring flag, absolute value of mount displacement quantity and ENG start execution flag when the vehicle of the first embodiment accelerated from a cruising. In FIG. 3, a thick solid line shown in a graph of the ENG start requiring flag indicates a control executed in this embodiment, while a thick dotted line indicates a conventional control.

As shown in FIG. 3, when the AP position rises as a result of the accelerator pedal being depressed while the vehicle is EV driven at a constant speed, the management ECU 119 raises the output of the motor 107 in response to an increase in the required output. As a result, the vehicle speed VP rises at an acceleration according to a change in the vehicle speed VP. As this occurs, a force according to the acceleration which acts in an opposite direction to the heading direction of the vehicle is exerted on the internal combustion engine 109, whereby the internal combustion engine 109 is strongly pressed against the vehicle body 127 via the engine mount 125. As a result, the mount displacement quantity changes as shown in FIG. 3.

While the vehicle is EV driven, the APU activation determination portion 151 of the management ECU 119 determines whether or not the APU 121 needs to be activated to operated according to the SOC of the battery 101 and the required output which is calculated based on the vehicle speed VP and the AP position. Having determined that the APU 121 needs to be activated to operate, the APU activation determination portion 151 sets up an APU activation requiring flag (APU activation requiring flag←1). In the management ECU 119 which sets up the APU activation requiring flag, in the case a mount displacement quantity exceeds a threshold Mth+, the internal combustion engine operation control portion 155 does not set up an ENG start execution flag which indicates whether or not the internal combustion engine 109 is started. Namely, the internal combustion engine operation control portion 155 prohibits a start of the internal combustion engine 109 although the APU activation requiring flag is set up in the case the mount displacement quantity exceeds the threshold Mth+. Thereafter, in the case the mount displacement quantity lowers to or below the threshold Mth+ as a result of a reduction in acceleration, the internal combustion engine operation control portion 155 sets up the ENG start execution flag (ENG start execution flag←1). In this way, the internal combustion engine operation control portion 155 permits a start of the internal combustion engine 109.

In the example shown in FIG. 3, the APU activation requiring flag is set up at a time t10, but the mount displacement quantity exceeds the threshold Mth+. Therefore, the internal combustion engine operation control portion 155 does not set up the ENG start execution flag. Thereafter, since the mount displacement quantity lowers to the threshold Mth+ at a time t11, the internal combustion engine operation control portion 155 sets up the ENG start execution flag.

Figure 4:
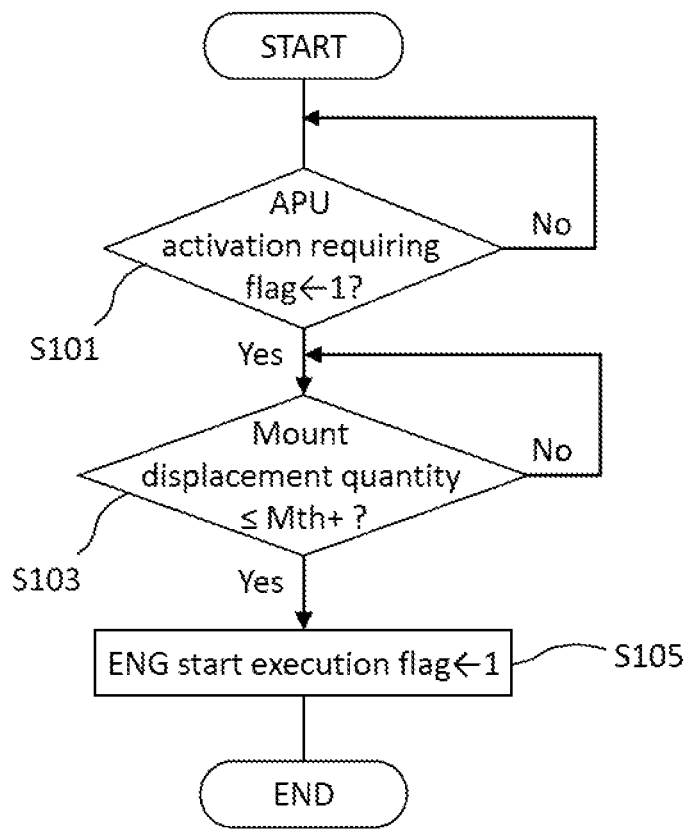
FIG. 4 is a flowchart showing an operation of the management ECU 119 when the vehicle of the first embodiment is EV driven.

FIG. 4 is a flowchart showing an operation of the management ECU 119 when the vehicle of the first embodiment is EV driven. As shown in FIG. 4, the internal combustion engine operation control portion 155 of the management ECU 119 determines whether or not the APU activation requiring flag has been set up (APU activation requiring flag←1) (step S101). If the internal combustion engine operation control portion 155 determines that the APU activation requiring flag has been set up, the flow proceeds to step S103. In step S103, the internal combustion engine operation control portion 155 determines whether or not the mount displacement quantity is equal to or smaller than the threshold Mth+. If the "mount displacement quantity≤the threshold Mth+," the flow proceeds to step S105, whereas if the "mount displacement quantity>the threshold Mth+, the flow returns to step S103. In step S105, the internal combustion engine operation control portion 155 sets up the ENG start execution flag (ENG start execution flag←1).

Second Example

Stop of Internal Combustion Engine 109

Figure 5:
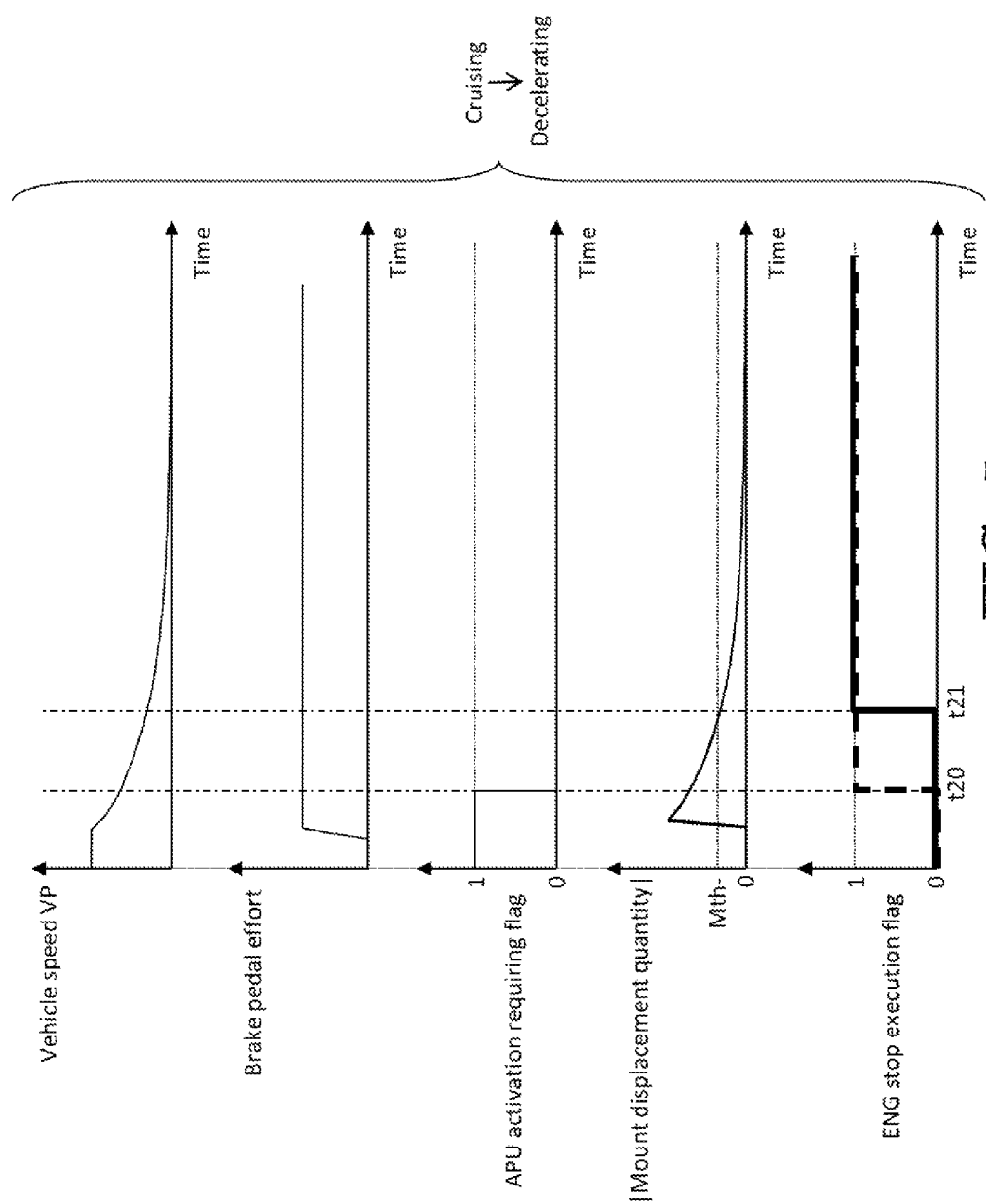
FIG. 5 is a graph showing an example of a change in each of vehicle speed VP, brake pedal effort, APU activation requiring flag, absolute value of mount displacement quantity and ENG stop execution flag when the vehicle of the first embodiment is decelerated from a cruising.

FIG. 5 is a graph showing an example of a change in each of vehicle speed VP, brake pedal effort, APU activation requiring flag, absolute value of mount displacement quantity and ENG stop execution flag when the vehicle of the first embodiment is decelerated from a cruising. In FIG. 5, a thick solid line shown in a graph of the ENG start requiring flag indicates a control executed in this embodiment, while a thick dotted line indicates a conventional control.

As shown in FIG. 5, when the brake pedal effort rises as a result of the brake pedal being depressed while the vehicle is series driven at a constant speed, the management ECU 119 activates a mechanical brake or controls the motor 107 to execute a regenerative operation. As a result, the vehicle speed VP falls at a deceleration (a negative acceleration) corresponding to a change in vehicle speed VP. As this occurs, a force according to the deceleration which acts in the same direction as the heading direction of the vehicle is exerted on the internal combustion engine 109, whereby the internal combustion engine 109 is strongly pressed against the vehicle body 127 via the engine mount 125. As a result, the mount displacement quantity changes as shown in FIG. 5.

While the vehicle is series driven, the APU activation determination portion 151 of the management ECU 119 determines whether or not the APU 121 needs to be activated to operated according to the SOC of the battery 101, the vehicle speed VP, and the AP position and the brake pedal effort which represent a requirement made to the vehicle by the driver through operation of the accelerator pedal and the brake pedal. Having determined that the APU 121 does not need to be activated to operate, the APU activation determination portion 151 sets down the APU activation requiring flag (APU activation requiring flag←0). In the management ECU 119 which sets down the APU activation requiring flag, in the case the mount displacement quantity exceeds a threshold Mth−, the internal combustion engine operation control portion 155 does not set up an ENG stop execution flag, which indicates whether or not the internal combustion engine 109 is stopped. Namely, the internal combustion engine operation control portion 155 prohibits a stop of the internal combustion engine 109 although the APU activation requiring flag is set down in the case the mount displacement quantity exceeds the threshold Mth−. Thereafter, in the case the mount displacement quantity lowers to or below the threshold Mth− as a result of a reduction in deceleration, the internal combustion engine operation control portion 155 sets up the ENG stop execution flag (ENG stop execution flag←1). In this way, the internal combustion engine operation control portion 155 permits a stop of the internal combustion engine 109. In addition to stopping the internal combustion engine 109, the internal combustion engine operation control portion 155 may lower the torque of the internal combustion engine 109 or change the revolution speed of the internal combustion engine 109.

In the example shown in FIG. 5, the APU activation requiring flag is set down at a time t20, but the mount displacement quantity exceeds the threshold Mth−. Therefore, the internal combustion engine operation control portion 155 does not set up the ENG stop execution flag. Thereafter, since the mount displacement quantity lowers to the threshold Mth− at a time t21, the internal combustion engine operation control portion 155 sets up the ENG start execution flag.

Figure 6:
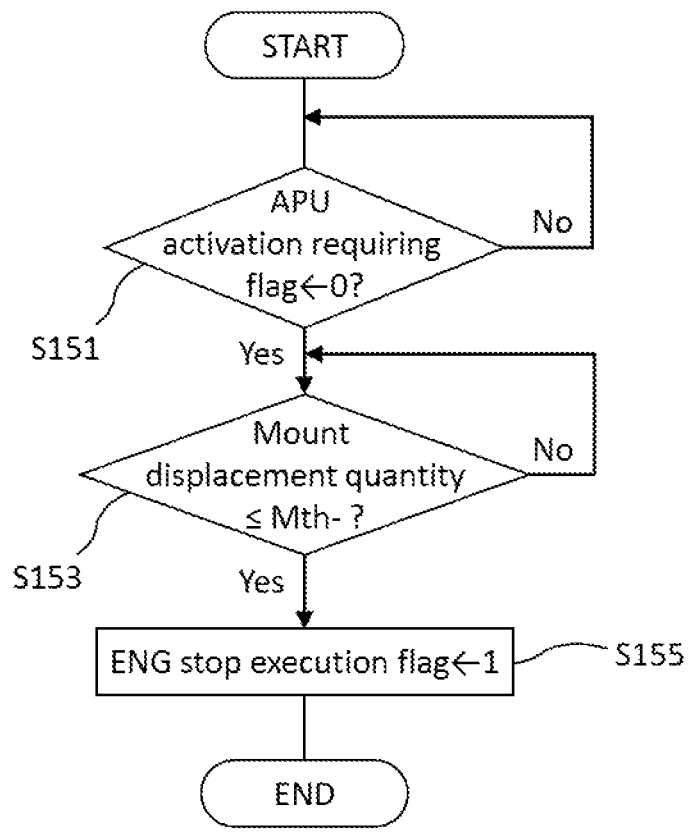
FIG. 6 is a flowchart showing an operation of the management ECU 119 when the vehicle of the first embodiment is series driven.

FIG. 6 is a flowchart showing an operation of the management ECU 119 when the vehicle of the first embodiment is series driven. As shown in FIG. 4, the internal combustion engine operation control portion 155 of the management ECU 119 determines whether or not the APU activation requiring flag has been set down (APU activation requiring flag←0) (step S151). If the internal combustion engine operation control portion 155 determines that the APU activation requiring flag has been set down, the flow proceeds to step S153. In step S153, the internal combustion engine operation control portion 155 determines whether or not the mount displacement quantity is equal to or smaller than the threshold Mth−. If the "mount displacement quantity≤the threshold Mth−," the flow proceeds to step S155, whereas if the "mount displacement quantity>the threshold Mth−, the flow returns to step S153. In step S155, the internal combustion engine operation control portion 155 sets up the ENG stop execution flag (ENG stop execution flag←1).

Thus, as has been described heretofore, in this embodiment, the start or stop of the internal combustion engine 109 is prohibited in the case the mount displacement quantity exceeds the threshold, and the timing at which the internal combustion engine 109 is started or stopped is not limited to when the mount displacement quantity is equal to or smaller than the threshold. In the case the mount displacement quantity is equal to or smaller than the threshold, much of vibration generated when the internal combustion engine 109 is started or stopped is absorbed by the engine mount 125 and hence is not transmitted to the vehicle body 127. Consequently, the NV performance is not reduced by the start or stop of the internal combustion engine 109.

Second Embodiment

A second embodiment differs from the first embodiment in that an internal combustion engine operation control portion 255 of a management ECU 219 operates differently. The second embodiment is similar to the first embodiment excluding the feature described above, and hence, the description of features which are the same as or similar to those of the first embodiment will be simplified or omitted.

Figure 7:
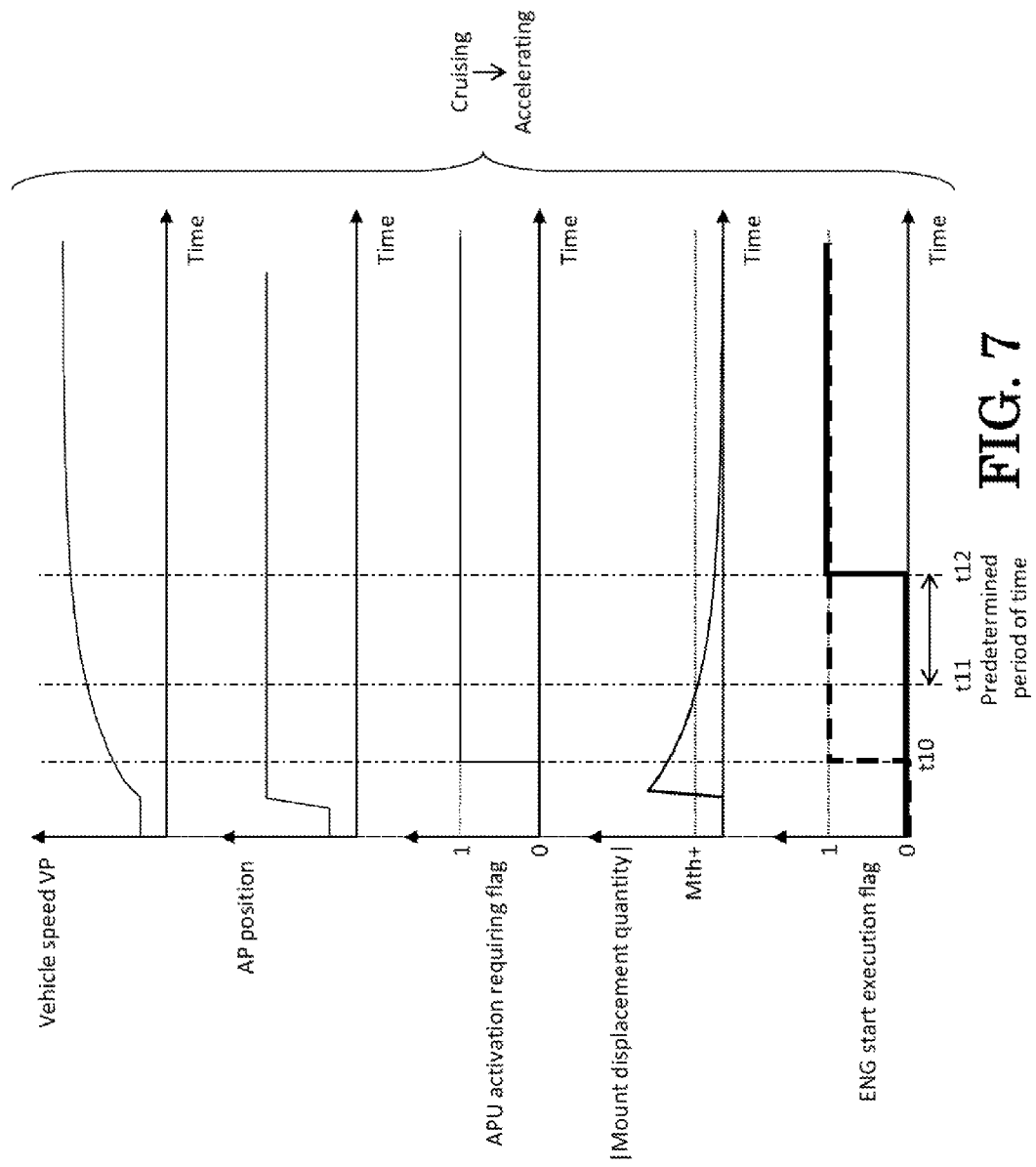
FIG. 7 is a graph showing an example of a change in each of vehicle speed VP, AP position, APU activation requiring flag, absolute value of mount displacement quantity and ENG start execution flag when a vehicle of a second embodiment is accelerated from a cruising.

FIG. 7 is a graph showing an example of a change in each of vehicle speed VP, AP position, APU activation requiring flag, absolute value of mount displacement quantity and ENG start execution flag, when a vehicle of the second embodiment is accelerated from a cruising. In FIG. 7, a thick solid line shown in a graph of the ENG start requiring flag indicates a control executed in this embodiment, while a thick dotted line indicates a conventional control.

As shown in FIG. 7, since a mount displacement quantity exceeds a threshold Mth+ although an APU activation requiring flag is set up at a time t10, the internal combustion engine operation control portion 255 of the management ECU 219 of the second embodiment does not set up an ENG start execution flag, similar to the first embodiment. Thereafter, although the mount displacement quantity lowers to the threshold Mth+ at a time t11, the internal combustion engine operation control portion 255 sets up the ENG start execution flag in the case a predetermined period of time elapses from the time t11 with the mount displacement quantity kept as the "mount displacement quantity≤the threshold Mth+."

Figure 8:
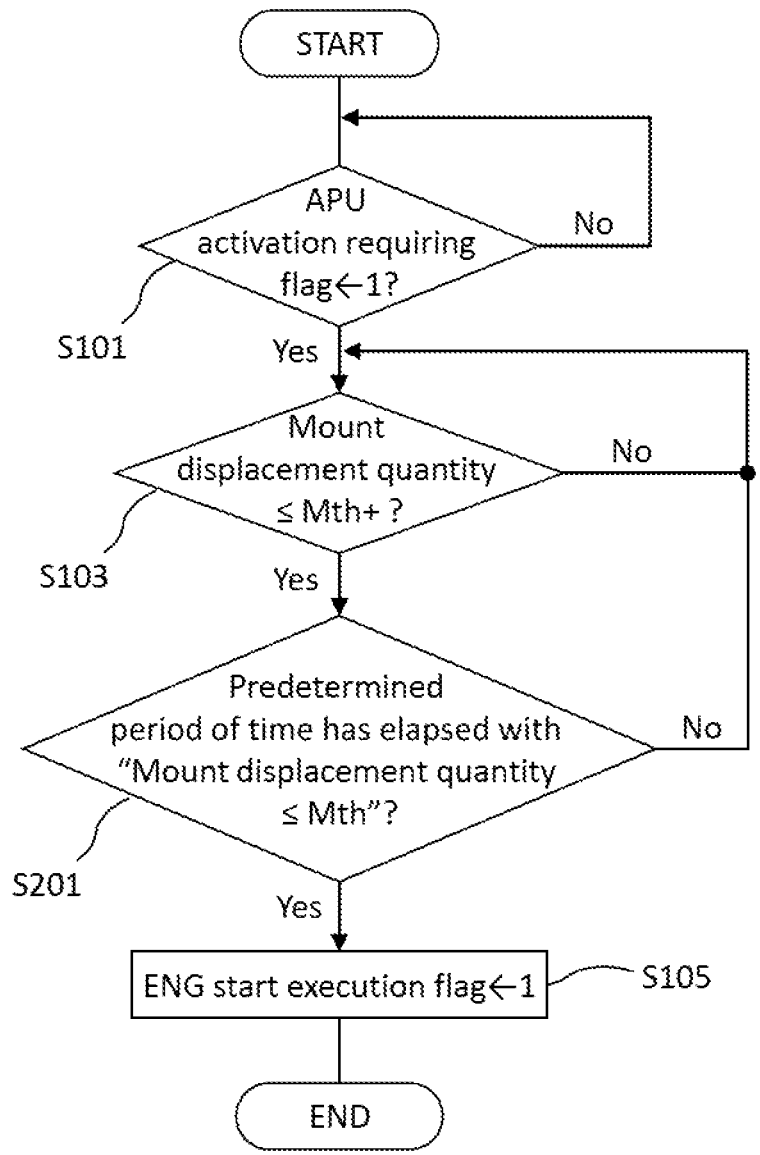
FIG. 8 is a flowchart showing an operation of a management ECU 219 when the vehicle of the second embodiment is EV driven.

FIG. 8 is a flowchart showing an operation of the management ECU 219 when the vehicle of the second embodiment is EV driven. In FIG. 8, like reference numerals will be given to steps common to the steps of the first embodiment shown in FIG. 4, so that the description of those steps will be simplified or omitted. As shown in FIG. 8, if the determination made in step S103 determines the "mount displacement quantity≤the threshold Mth+," the flow proceeds to step S201. In step S201, the internal combustion engine operation control portion 255 of the management ECU 219 determines whether or not a predetermined period of time has elapsed with the mount displacement quantity kept as the "mount displacement quantity≤the threshold Mth+." If it is determined that the predetermined period of time has elapsed, the flow proceeds to step S105, whereas unless the predetermined period of time has elapsed, the flow returns to step S103.

The control made by the internal combustion engine operation control portion 255 of the management ECU 219 in the way described above is also applicable to the control of the timing at which the internal combustion engine 109 is stopped which is described in the second example of the first embodiment. Namely, although the APU activation requiring flag is set down while the vehicle is series driven, when the mount displacement quantity becomes equal to or smaller than the threshold and the predetermined period of time elapses with the mount displacement quantity kept in that state, the internal combustion engine operation control portion 255 sets up an ENG stop execution flag.

In this way, in this embodiment, the mount displacement quantity is not changed frequently by the depression of the accelerator pedal or the brake pedal by the driver of the vehicle or the change in state of a road on which the vehicle is driving, and the internal combustion engine 109 can be started or stopped with the mount displacement quantity stabilized to stay at the threshold Mth+.

Third Embodiment

A third embodiment differs from the second embodiment in that an internal combustion engine operation control portion 355 of a management ECU 319 operates differently. The third embodiment is similar to the second embodiment excluding the feature described above, and hence, the description of features which are the same as or similar to those of the second embodiment will be simplified or omitted.

Figure 9:
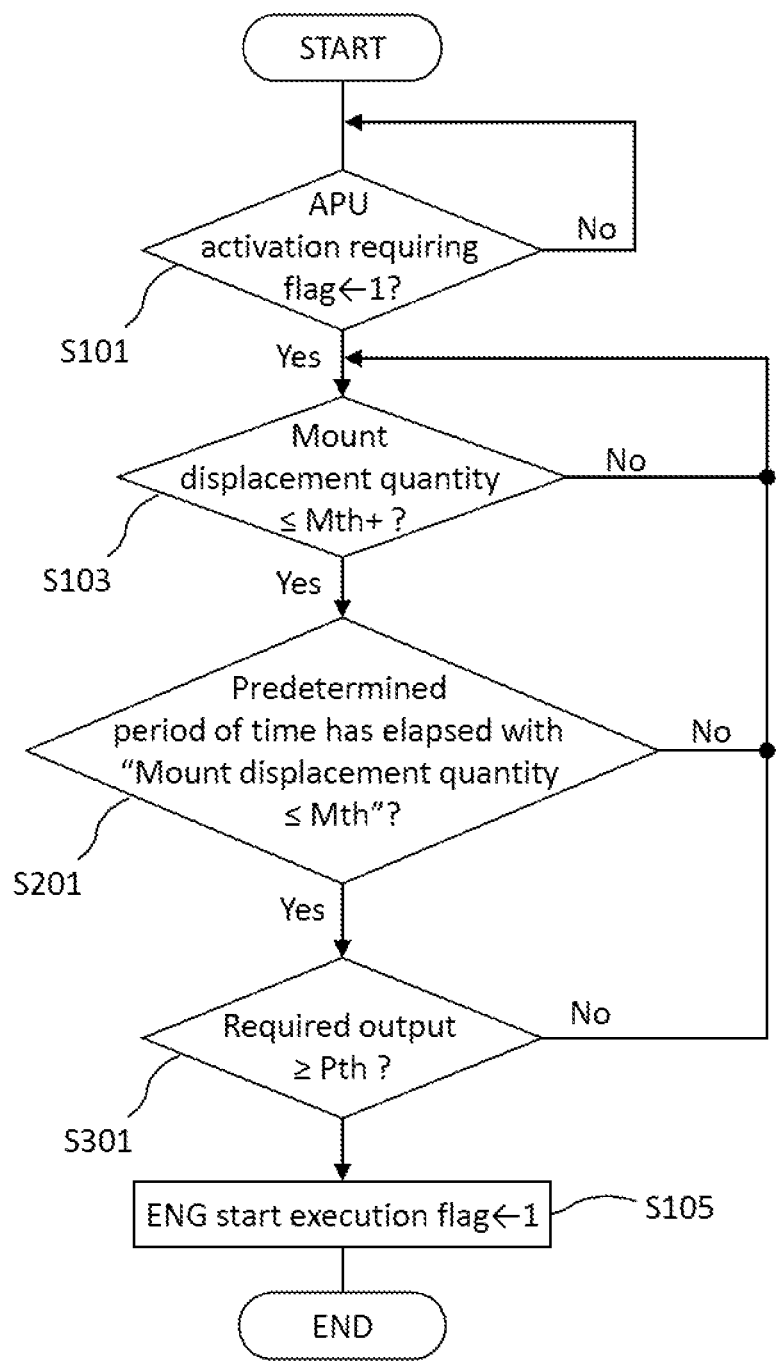
FIG. 9 is a flowchart showing an operation of a management ECU 319 when a vehicle of a third embodiment is EV driven.

FIG. 9 is a flowchart showing an operation of the management ECU 319 when a vehicle of the third embodiment is EV driven. In FIG. 9, like reference numerals will be given to steps like to the steps of the second embodiment shown in FIG. 8, so that the description of those steps will be simplified or omitted. As shown in FIG. 9, if a predetermined period of time has elapsed with a mount displacement quantity kept as a "mount displacement quantity≤a threshold Mth+" in step S201, the flow proceeds to step S301. In step S301, the internal combustion engine operation control portion 355 of the management ECU 319 determines whether or not a required output calculated then based on a vehicle speed VP and an AP position is equal to or greater than a predetermined value Pth. If it is determined that the "required output≥the predetermined value Pth," the flow proceeds to step S105, whereas if the "required output<the predetermined value," the flow returns to step S103.

The control made by the internal combustion engine operation control portion 355 of the management ECU 319 in the way described above is also applicable to the control of the timing at which the internal combustion engine 109 is stopped which is described in the second embodiment. Namely, although the APU activation requiring flag is set down while the vehicle is series driven, in the case the required output is equal to or greater than the predetermined value Pth when the mount displacement quantity becomes equal to or smaller than the threshold and the predetermined period of time elapses with the mount displacement quantity kept in that state, the internal combustion engine operation control portion 355 sets up an ENG stop execution flag.

In this way, in this embodiment, since the internal combustion engine 109 is started or stopped when the required output is equal to or greater than the predetermined value, that is, when the driving energy of the vehicle is great and hence the NV level is high, it is possible to suppress the reduction in the NV performance.

The predetermined value Pth may be a value which becomes greater as the vehicle speed becomes faster. Similarly, the predetermined value Pth may be a value which becomes greater as the gradient of a road on which the vehicle drives becomes steeper.

While the invention has been described in detail and by reference to the specific embodiments, it is obvious to those skilled in the art to which the invention pertains that various alterations or modifications can be made thereto without departing from the spirit and scope of the invention.

The management ECUs 119, 219, 319 of the embodiments may set up the ENG start execution flag as soon as the APU activation requiring flag is set up in the case the ECUs determine that the energy consumption is high in the vehicle or that the priority of maintaining the energy in the vehicle is high. The energy consumption is derived from vehicle speed VP, a consumed output by the motor 107 and the SOC of the battery 101.

Figure 10:
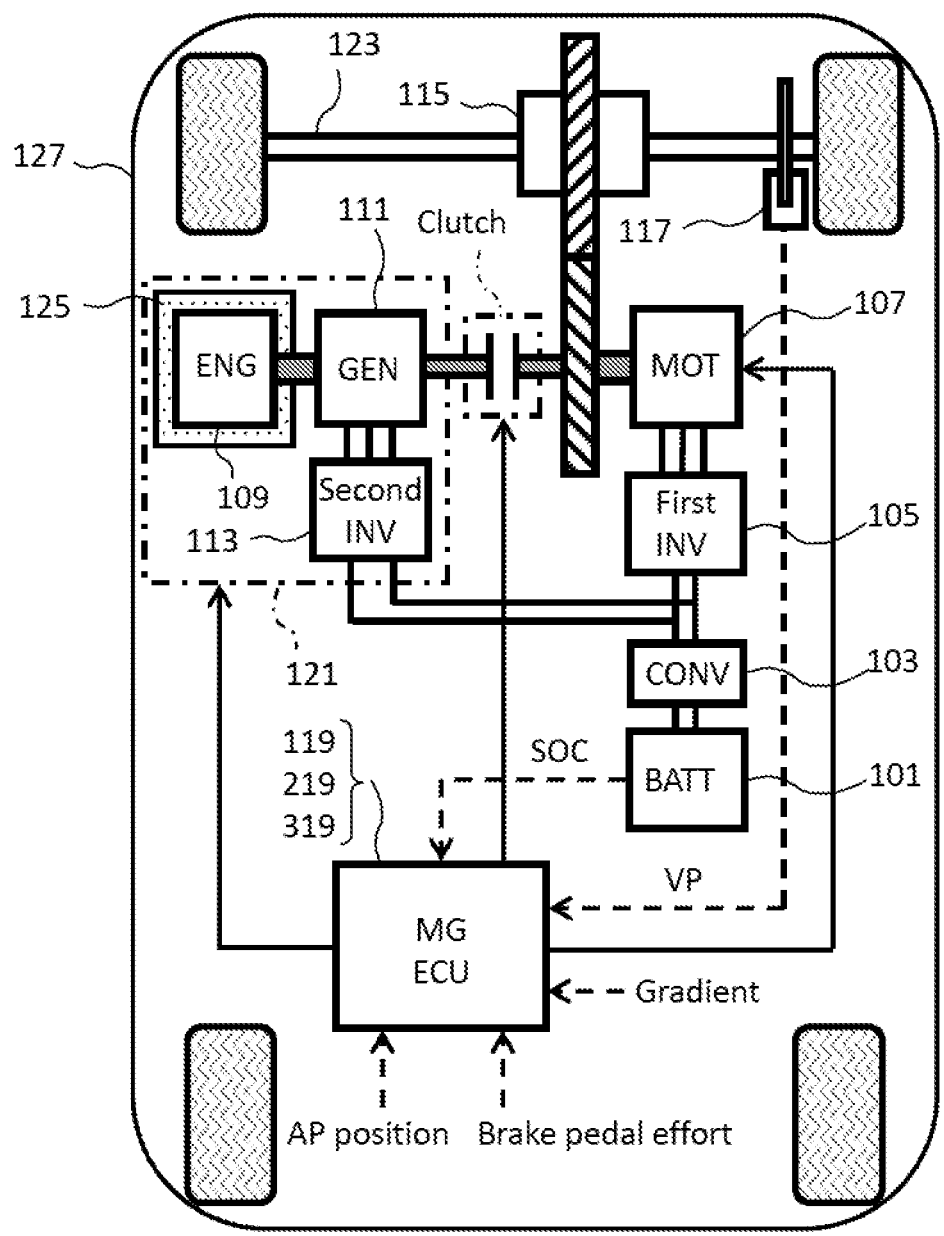
FIG. 10 is a block diagram showing an internal configuration of a series/parallel system HEV.

In the embodiments, while the invention is described as being applied to the series system HEV, the invention can also be applied to a series/parallel system HEV shown in FIG. 10.

This patent application is based on the Japanese Patent Application (No. 2013-064964) filed on Mar. 26, 2013, the contents of which are incorporated herein by reference.

DESCRIPTION OF REFERENCE NUMERALS AND CHARACTERS 101 battery (BATT)
103 converter (CONV)
105 first inverter (first INV)
107 motor (Mot)
109 internal combustion engine (ENG)
111 generator (GEN)
113 second inverter (second INV)
115 gearbox
117 vehicle speed sensor
119, 219, 319 management ECU (MG ECU)
121 APU
123 drive shaft
125 engine mount
127 vehicle body
151 APU activation determination portion
153 mount displacement quantity deriving portion
155, 255, 355 internal combustion engine operation control portion

The invention claimed is:

1. An internal combustion engine control device for a hybrid vehicle comprising:
a rechargeable battery which supplies electric power to a motor which is a drive source of the hybrid vehicle;
a generation which has an internal combustion engine and a generator generating electric power by means of an operation of the internal combustion engine, and which supplies the electric power generated by the generator to the motor or the battery;
the motor which is driven by means of electric power supplied from at least one of the battery and the generation unit; and
a mount which has a vibration isolating function, and which connects the internal combustion engine to a vehicle body of the hybrid vehicle,
wherein the internal combustion engine control device comprises:
a generation unit activation determination portion which determines whether or not the generation unit needs to be activated to operate before the internal combustion engine starts;
a mount displacement quantity deriving portion which derives a mount displacement quantity indicating an extended/contracted length of the mount; and
an internal combustion engine control portion which prohibits a start of the internal combustion engine in a case the mount displacement quantity derived by the mount displacement quantity deriving portion exceeds a threshold when the generation unit activation determination portion determines that the generation unit needs to be activated to operate.

2. The internal combustion engine control device according claim 1,
wherein the internal combustion engine control portion permits the start of the internal combustion engine irrespective of the mount displacement quantity in a case the generation unit activation determination portion determines that the generation unit needs to be activated to operate when an energy consumption state is high in the hybrid vehicle.

3. The internal combustion engine control device according to claim 1,
wherein the internal combustion engine control portion permits the start or stop of the internal combustion engine in a case the mount displacement quantity is smaller than or equal to the threshold when the generation unit activation determination portion determines that the generation unit needs or does not need to be activated to operate.

4. The internal combustion engine control device according to claim 3,
wherein the internal combustion engine control portion permits the start or stop of the internal combustion engine in a case a predetermined period of time elapses with the mount displacement quantity kept smaller that or equal to the threshold when the generation unit activation determination portion determines that the generation unit needs or does not need to be activated to operate.

5. The internal combustion engine control device according to claim 4,
wherein the internal combustion engine control portion permits the start or stop of the internal combustion engine in a case a required output according to an operation by a driver of the hybrid vehicle is equal to or greater than a predetermined value when a predetermined period of time elapses with the mount displacement quantity kept smaller than or equal to the threshold, in a case that the generation unit activation determination portion determines that the generation unit needs or does not need to be activated to operate.

6. The internal combustion engine control device according to claim 5,
wherein the predetermined value is higher as a driving speed of the hybrid vehicle is faster.

7. The internal combustion engine control device according to claim 5,
wherein the predetermined value is higher as a gradient of a road on which the hybrid vehicle drives is greater.

8. An internal combustion engine control device for a hybrid vehicle comprising:
a rechargeable battery which supplies electric power to a motor which is a drive source of the hybrid vehicle;
a generation unit which has an internal combustion engine and a generator generating electric power by means of an operation of the internal combustion engine, and which supplies the electric power generated by the generator to the motor or the battery;
the motor which is driven by means of electric power supplied from at least one of the battery and the generation unit; and
a mount which has a vibration isolating function, and which connects the internal combustion engine to a vehicle body of the hybrid vehicle,
wherein the internal combustion engine control device comprises:
a generation unit activation determination portion which determines whether or not the generation unit needs to be activated to operate before the internal combustion engine stops;
a mount displacement quantity deriving portion which derives a mount displacement quantity indicating an extended/contracted length of the mount; and
an internal combustion engine control portion which prohibits a stop of the internal combustion engine in a case the mount displacement quantity derived by the mount displacement quantity deriving portion exceeds a threshold when the generation unit activation determination portion determines that the generation unit does not need to be activated to operate.

9. The internal combustion engine control device according to claim 8,
wherein the internal combustion engine control portion permits the start or stop of the internal combustion engine in a case the mount displacement quantity is smaller than or equal to the threshold when the generation unit activation determination portion determines that the generation unit needs or does not need to be activated to operate.

10. An internal combustion engine control method for a hybrid vehicle comprising:
a rechargeable battery which supplies electric power to a motor which is a drive source of the hybrid vehicle;
a generation unit which has an internal combustion engine and a generator generating electric power by means of an operation of the internal combustion engine, and which supplies the electric power generated by the generator to the motor or the battery;
the motor which is driven by means of electric power supplied from at least one of the battery and the generation unit; and
a mount which has a vibration isolating function, and which connects the internal combustion engine to a vehicle body of the hybrid vehicle,
wherein the internal combustion engine control method comprises the steps of:
determining whether or not the generation unit needs to be activated to operate before the internal combustion engine starts;
deriving a mount displacement quantity which indicates an extended/contracted length of the mount; and
prohibiting a start of the internal combustion engine in a case the mount displacement quantity exceeds a threshold when it is determined that the generation unit needs to be activated to operate.

11. An internal combustion engine control method for a hybrid vehicle comprising:
a rechargeable battery which supplies electric power to a motor which is a drive source of the hybrid vehicle;
a generation unit which has an internal combustion engine and a generator generating electric power by means of an operation of the internal combustion engine, and which supplies the electric power generated by the generator to the motor or the battery;
the motor which is driven by means of electric power supplied from at least one of the battery and the generation unit; and
a mount which has a vibration isolating function, and which connects the internal combustion engine to a vehicle body,
wherein the internal combustion engine control method comprises the steps of:
determining whether or not the generation unit needs to be activated to operate before the internal combustion engine stops;
deriving a mount displacement quantity which indicates an extended/contracted length of the mount; and
prohibiting a stop of the internal combustion engine in a case the mount displacement quantity exceeds a threshold when it is determined that the generation unit does not need to be activated to operate.

* * * * *